(12) United States Patent
Boeve (10) Patent No.: US 7,070,187 B2
(45) Date of Patent: Jul. 4, 2006

(54) GASKET ASSEMBLY

(75) Inventor: Gregory Andrew Boeve, Oxford, MI (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 0 days.

(21) Appl. No.: 10/984,215

(22) Filed: Nov. 9, 2004

(65) Prior Publication Data

US 2006/0097458 A1     May 11, 2006

(51) Int. Cl.
*F02F 11/00*     (2006.01)
*F16J 15/02*     (2006.01)

(52) U.S. Cl. ................ 277/598; 277/628; 277/630

(58) Field of Classification Search ............. 277/590, 277/593, 598, 603, 628, 630, 638, 639, 650, 277/653

See application file for complete search history.

(56) References Cited

U.S. PATENT DOCUMENTS

| | | | | |
|---|---|---|---|---|
| 2,167,643 A * | 8/1939 | Dickson | ............... | 277/600 |
| 3,448,986 A * | 6/1969 | Jelinek et al. | ............... | 277/596 |
| 3,473,813 A * | 10/1969 | Meyers et al. | ............... | 277/601 |
| 3,586,338 A | 6/1971 | Miklau et al. | ............... | 277/1 |
| 3,655,210 A * | 4/1972 | Farnam et al. | ............... | 277/592 |
| 3,930,656 A | 1/1976 | Jelinek | ............... | 277/180 |
| 3,957,279 A * | 5/1976 | Belter | ............... | 277/594 |
| 4,114,906 A | 9/1978 | Jelinek | ............... | 277/166 |
| 4,372,120 A | 2/1983 | Ford, Jr. et al. | ............... | 60/605 |
| 4,405,138 A | 9/1983 | Skrycki | ............... | 277/235 B |
| 4,535,996 A * | 8/1985 | Cardis et al. | ............... | 277/313 |
| 4,560,718 A | 12/1985 | Ritchey | ............... | 524/13 |
| 4,655,463 A * | 4/1987 | Inciong et al. | ............... | 277/593 |
| 4,813,691 A * | 3/1989 | Schoenborn | ............... | 277/598 |
| 4,828,275 A * | 5/1989 | Udagawa | ............... | 277/596 |
| 4,846,482 A | 7/1989 | Blodgett et al. | ............... | 277/235 B |
| 4,867,461 A * | 9/1989 | Shimmell | ............... | 277/593 |
| 4,955,621 A | 9/1990 | Skrycki | ............... | 277/166 |
| 5,024,863 A | 6/1991 | Gibbon | ............... | 427/387 |
| 5,121,932 A * | 6/1992 | Goldman et al. | ............... | 277/600 |
| 5,121,933 A | 6/1992 | Silvers | ............... | 277/235 B |
| 5,122,214 A | 6/1992 | Zurfluh et al. | ............... | 156/220 |
| 5,232,228 A * | 8/1993 | Miyaoh | ............... | 277/313 |
| 5,267,740 A | 12/1993 | Stritzke | ............... | 277/235 B |
| 5,322,299 A * | 6/1994 | Terai | ............... | 277/596 |
| 5,590,888 A | 1/1997 | Brummer et al. | ............... | 277/235 B |
| 5,700,015 A | 12/1997 | Tensor | ............... | 277/180 |
| 5,890,719 A * | 4/1999 | Bettencourt | ............... | 277/599 |
| 5,947,483 A | 9/1999 | Brummer et al. | ............... | 277/592 |

(Continued)

*Primary Examiner*—Vishal Patel
*Assistant Examiner*—Gay Ann Spahn
(74) *Attorney, Agent, or Firm*—Robert L. Stearns (57) ABSTRACT

A gasket assembly includes a plurality of carriers. Each carrier has at least one non-sealing aperture and at least one sealing aperture. The sealing aperture has a seal which extends around a perimeter of the sealing aperture and is attached to the carrier. The plurality of carriers comprises a stack of carriers with each of the carriers in the stack being in touching contact with at least one other of the carriers. The non-sealing apertures of the carriers are aligned to and associated with the sealing apertures such that each seal extends through aligned and associated non-sealing apertures in the other carriers to provide a first sealing surface at a first outer surface of the stack and a second sealing surface at a second outer surface of the stack. The carriers in the stack may be joined together to form the gasket assembly. The seals may include various materials, including elastomers, such as those commonly used in automotive vehicle applications.

18 Claims, 4 Drawing Sheets

U.S. PATENT DOCUMENTS

| | | | |
|---|---|---|---|
| 6,093,467 A | 7/2000 | Forry | 428/66.4 |
| 6,113,109 A * | 9/2000 | Lieb et al. | 277/590 |
| 6,129,360 A | 10/2000 | Walker et al. | 277/592 |
| 6,173,966 B1 * | 1/2001 | Noble et al. | 277/596 |
| 6,179,298 B1 * | 1/2001 | Schweiger | 277/598 |
| 6,189,895 B1 | 2/2001 | Yamada | 277/591 |
| 6,247,703 B1 | 6/2001 | Forry et al. | 277/592 |
| 6,268,020 B1 | 7/2001 | Forry et al. | 427/284 |
| 6,354,599 B1 * | 3/2002 | Inamura | 277/591 |
| 6,371,489 B1 | 4/2002 | Combet et al. | 277/594 |
| 6,517,085 B1 | 2/2003 | Udagawa et al. | 277/592 |
| 6,536,775 B1 * | 3/2003 | Inciong | 277/596 |
| 6,676,135 B1 * | 1/2004 | Carey | 277/594 |
| 6,932,354 B1 * | 8/2005 | Kane et al. | 277/608 |
| 2002/0020970 A1 | 2/2002 | Miyaoh et al. | 277/592 |
| 2003/0011139 A1 | 1/2003 | Miyaoh | 277/592 |
| 2003/0067122 A1 | 4/2003 | Hinson | 277/593 |
| 2003/0201610 A1 * | 10/2003 | Carey | 277/590 |
| 2003/0221654 A1 * | 12/2003 | Kueltzo et al. | 123/193.2 |
| 2004/0135323 A1 * | 7/2004 | Salameh | 277/628 |
| 2005/0006857 A1 * | 1/2005 | Gernand et al. | 277/628 |
| 2005/0269788 A1 * | 12/2005 | Grunfeld | 277/592 |

* cited by examiner

GASKET ASSEMBLY

BACKGROUND OF THE INVENTION

1. Technical Field

The present invention relates generally to gasket assemblies. More particularly, it relates to gasket assemblies which include multiple gasket carriers, and even more particularly to those which incorporates multiple seal materials in a single assembly.

2. Related Art

Modern sealing applications frequently call for sealing different fluids with different fluid compositions in different fluid passageways, such that different sealing materials are required to affect the seals. The fluid passageways are sometimes in close proximity to one another such that it is desirable to affect the seal on several fluid passageways with a single gasket assembly which incorporates a number of different seals having different seal compositions. This is frequently the case in automotive vehicles applications. One such example and in automotive vehicle includes a gasket assembly for sealing the intake manifold to the cylinder head, which may require a sealed joint for sealing engine oil, engine coolant and air/fuel passageways, and thus require engine oil resistant, engine coolant resistant and air/fuel resistant seals in a single gasket assembly.

One means of obtaining multiple seals made from multiple seal materials in a single gasket assembly has been to co-mold different seal materials, such as to different rubber or elastomeric materials, to a single gasket carrier. However, the different elastomeric materials may require different processing conditions (i.e., time, temperature and ambient atmosphere), the use of different primers or other adhesion promoters, the use of different carriers materials, or other items of difference which make co-molding, to a greater or lesser degree, either impossible or very undesirable.

Therefore, it would be desirable to develop an improved gasket assembly which addresses the limitations of related art gasket assemblies, particularly one which is suitable for automotive applications such as those described herein.

SUMMARY OF THE INVENTION

The present invention is a gasket assembly which permits the incorporation of multiple seal types in a single gasket assembly without the need for co-molding of the seals on the gasket carrier. The invention also includes a gasket assembly of a single seal type by using multiple carriers.

The gasket assembly of the invention includes a plurality of carriers. Each carrier has at least one non-sealing aperture and at least one sealing aperture. The sealing aperture has a seal which extends around a perimeter of the sealing aperture and is attached to the carrier. The plurality of carriers comprises a stack of carriers with each of the carriers in the stack being in touching contact with at least one other of the carriers. The non-sealing apertures of the carriers are aligned to and associated with the sealing apertures such that each seal extends through aligned and associated non-sealing apertures in the other carriers to provide a first sealing surface at a first outer surface of the stack and a second sealing surface at a second outer surface of the stack. The carriers in the stack may be joined together to form the gasket assembly. The seals may include various materials, including elastomers, such as those commonly used in automotive vehicle applications.

The gasket assembly of the invention is particularly advantageous for use in automotive vehicle applications where gasket assemblies are desired having seals formed from different elastomeric materials which are resistant to different vehicle fluids, such as engine coolants, engine oils and air/fuel mixtures.

While co-molding may be utilized in accordance with seals of the present invention, gasket assemblies of the invention are believed to be particularly advantageous because they enable the incorporation of multiple seal materials without the need for co-molding or similar methods, and thus can be utilized to form gasket assemblies where it is impractical to utilize such methods. For example, different seal materials may utilize different primers or require different cleaning, handling or processing conditions which are mutually exclusive, or which it is undesirable to apply to a single co-molded part.

Gasket assemblies of the present invention may also be utilized by making a stack of carriers which are each generally thinner than would be used if a single carrier was employed. This reduction in thickness offers the advantage that the carriers may be more easily fabricated using standard carrier fabrication techniques than would otherwise be possible.

BRIEF DESCRIPTION OF THE DRAWINGS

These and other features and advantages of the present invention will become more readily appreciated when considered in connection with the following detailed description and appended drawings, wherein like designations denote like elements, and wherein.

DETAILED DESCRIPTION OF THE PREFERRED EMBODIMENT

Figure 1:
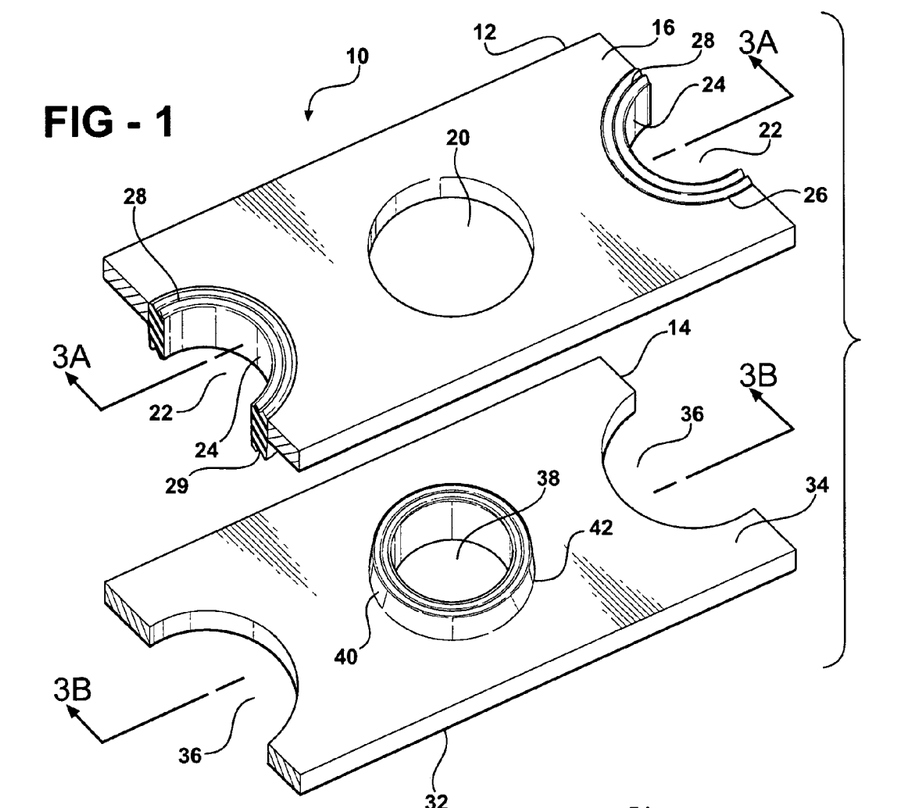
FIG. 1 is an exploded perspective view of the elements of a gasket assembly of the present invention.
Figure 2:
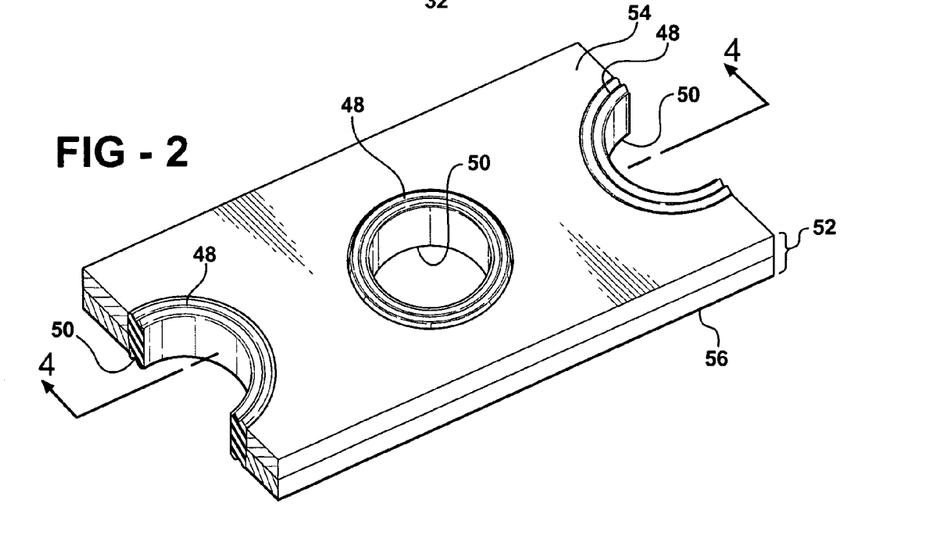
FIG. 2 is a perspective view of the assembled elements of a gasket assembly of the present invention.
Figures 3A, 3B:
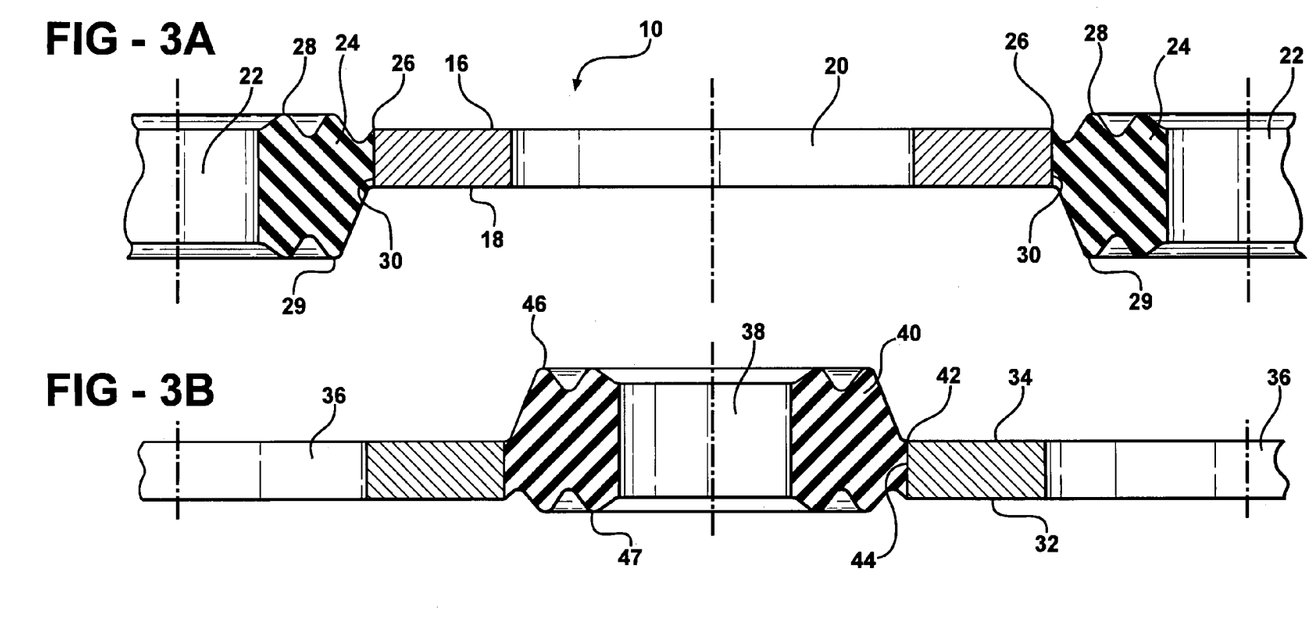
FIG. 3A is a cross-section view taken along the line 3A—3A of FIG. 1.
FIG. 3B is a cross-section view taken along the line 3B—3B of FIG. 1.
Figure 4:
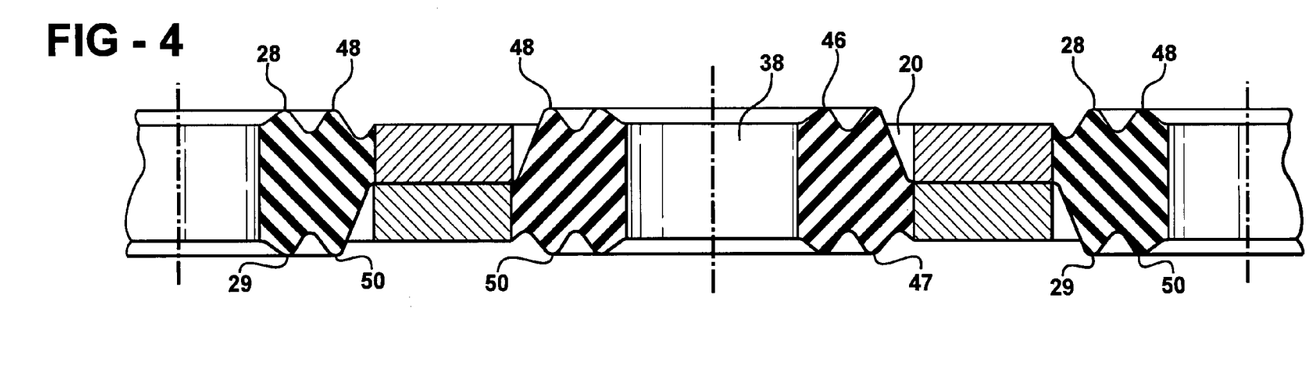
FIG. 4 is a cross-section view taken along the line 4—4 of FIG. 2.
Figure 5:
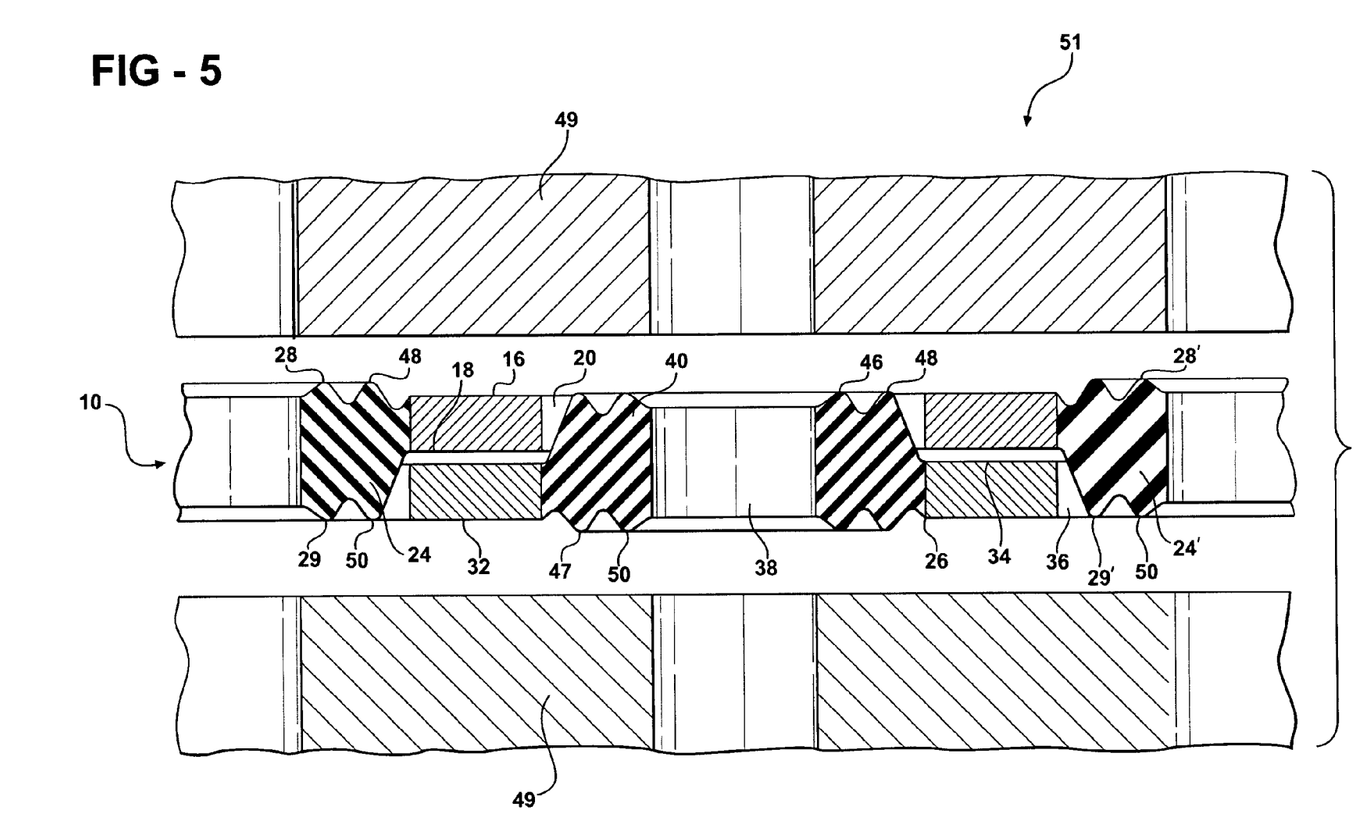
FIG. 5 is an exploded schematic cross-section view of a gasket of the present invention together with associated elements to be sealed.
Figure 6:
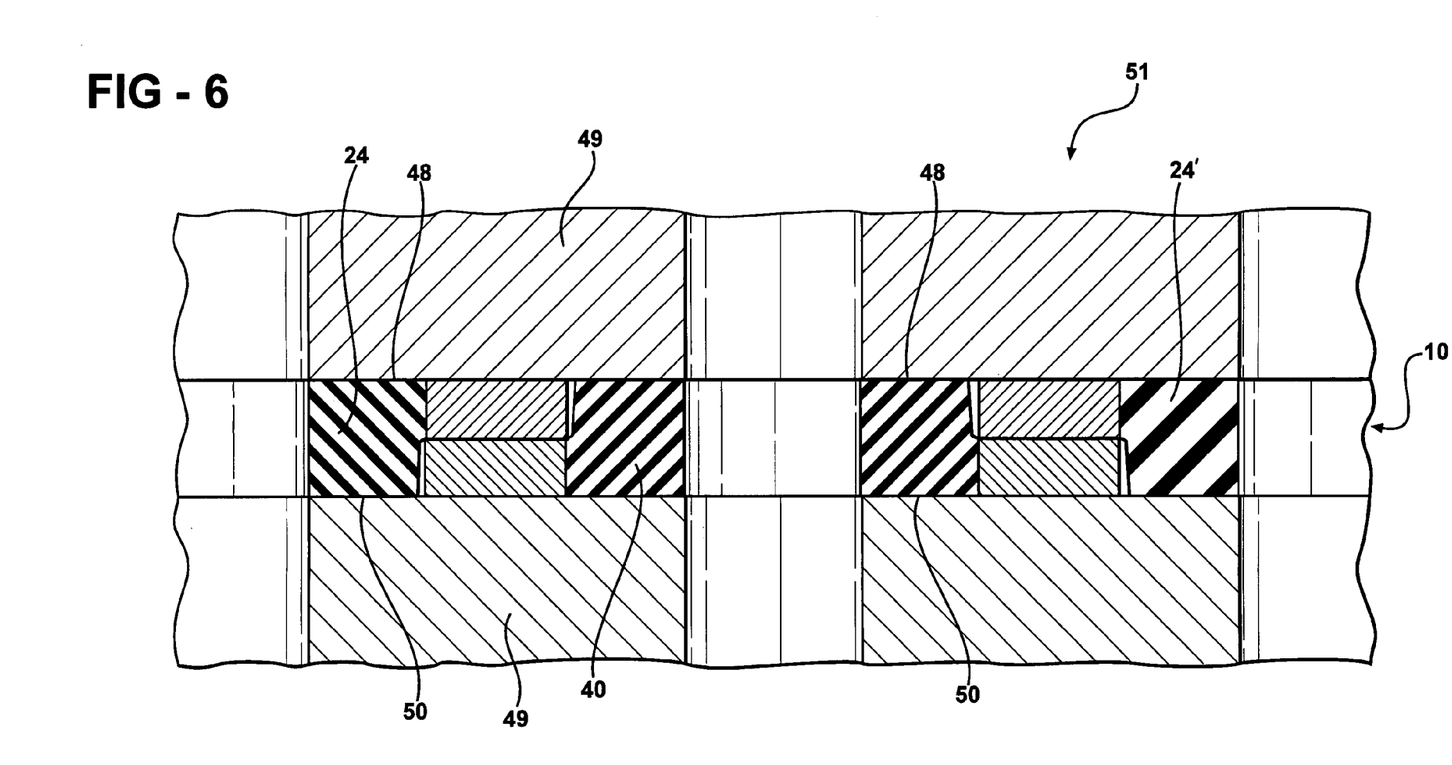
FIG. 6 is a schematic cross-section view of a gasket of the present invention and associated elements joined to form a sealed joint.

FIGS. 1–6 illustrate a gasket assembly 10 of the present invention. Gasket assembly 10 may be utilized in any application requiring a gasket to affect sealing between mating elements of a sealed a joint. While widely applicable to a number of sealed joint applications, the gasket assembly 10 of the present invention is believed to be particularly suited to a wide variety of automotive vehicle applications. In particular, gasket assembly 10 is particularly useful for provide intake manifold gaskets. Gasket assembly 10 is particularly advantageous in that it enables the utilization of multiple types of seal materials in a single gasket without the need for co-molding or other techniques which have been previously utilized to incorporate multiple types of seal materials into a single gasket body. This is particularly significant where the types of seal materials desired for use in gasket assembly 10 require the use of incompatible materials or processes, or require special handling which affects the cost to manufacture the gasket assembly, present other issues which make it undesirable or impossible to mold the materials onto a single carrier.

Gasket assembly 10 includes at least a first carrier 12 and a second carrier 14. As will be discussed below, additional carriers may also be utilized within the scope of the present invention. Carriers, including first carrier 12 and second carrier 14, may be made from any desirable gasket carrier material, including metals, engineering plastic materials, such as thermoplastic and thermoset materials, elastomers, composite materials and the like. Carriers, such as first carrier 12 and second carrier 14, may be of any desirable gasket shape, including flat sheets as illustrated in the FIGS. 1 and 2, or any number of curved, stepped, or other shapes. Regardless of the selected shape of the carriers, each carrier, such as first carrier 12 and second carrier 14, should be adapted for placement in a stacked or nested arrangement such that the upper and lower surfaces of the respective carriers are in touching contact with one another. Carriers, such as first carrier 12 and second carrier 14 may be made from the same material, or from different materials. Factors used in the selection of carrier materials, including whether they should be made from the same or different materials, will include the operating environment (i.e., fluid or chemical exposure, exposure to dirt and other contaminants, operating temperature) the position of the carrier within the stack (i.e., an internal member with minimal exposure to fluids, contaminants and the like, or an external member having more significant exposure to fluids, contaminants and the like), the materials comprising the elements of the sealed joint (i.e., chemical interaction and galvanic effects), the materials used for adjacent carriers (i.e., chemical interaction, galvanic interaction and the like) and the seal material selected for use with the carrier (i.e., adhesion strength and compatibility, potential galvanic activity and the like); Both sealing and non-sealing apertures may be of any suitable size and shape. They are illustrated herein as generally cylindrical, but may be rectangular, square, elliptical, oval, triangular, or otherwise polygonal or irregular in shape depending on the shape of the passageway to be sealed and the sealing surface. However, they will generally be closed shapes, such that they have a defined and continuous or closed perimeter. Aperture size may vary according to the types of opening and passageway to be sealed. For example, in an intake manifold gasket assembly, coolant passageways will generally be of a different size and/or shape than fuel air passageways which are in turn generally of a different size and shape than oil passageways and openings. Thus, the sizes of apertures in gasket assembly 10 associated with these passageways and openings will vary from one another accordingly.

Referring to FIGS. 1–4, first carrier 12 has an outer surface 16 and a carrier mating surface 18. First carrier 12 has at least one non-sealing aperture 20 and at least one sealing aperture 22. First carrier 12 also includes at least one first seal 24 which is attached to first carrier 12 and which extends around a perimeter 26 of the sealing aperture 22. A non-sealing aperture 20 is one which does not have a seal associated with it. The primary purpose of non-sealing apertures 20 is to provide openings for seals associated with other carriers. Non-sealing apertures 20 will be located and sized such that they permit seals associate with sealing-apertures of other carriers to pass through them. Typically, non-sealing apertures 20 will be sized somewhat larger than an associated seal from another carrier or carriers so as to permit the seal to freely pass through apertures 20 in order to assemble gasket assembly 10, and will also be sized such that adequate space exists between such seals 40 and any of apertures 20 so as to allow such seals to be compressed and to laterally expand if necessary during utilization of gasket assembly 10 sufficiently to obtain the desired level of sealing, including applying the desired sealing pressure on the upper sealing surface 46 and lower sealing surface 47 of such seals 40 (see FIG. 6). Seal or seals 24 will preferably be attached to a sidewall 30 of sealing aperture 22. Alternately, it may also be possible to attach seal 24 to one or both of outer surface 16 or mating surface 18, or any combinations of sidewall 30, outer surface 16 or mating surface 18. Attachment of seal 24 may be made by molding the seal to the carrier 12 using well-known molding methods which will vary according to the material selected for carrier 12 and seal 24, or by adhering the seal 24 to the carrier 12 using adhesives or thermal bonding, or by other well-known methods and means of attachment, including the use of mechanical fasteners, slip or compression fit of seals 24 having features which interlock with the carrier 12 and the like. While first carrier is described herein as having at least one non-sealing aperture 20 and at least one sealing aperture 22, it will be understood that first carrier 12 may have any number of sealing apertures 22 and non-sealing apertures necessary to implement a desired gasket design.

Referring again to FIGS. 1–4, similarly, second carrier 14 has an outer surface 32 and a carrier mating surface 34. Second carrier 14 has at least one non-sealing aperture 36 and at least one sealing aperture 38. Second carrier 14 also includes at least one second seal 40 which is attached to second carrier 14 and which extends around a perimeter 42 of the sealing aperture 38. As described previously, a non-sealing aperture 36 is one which does not have a seal associated with it. The primary purpose of non-sealing apertures 36 is to provide openings as pass-throughs or passageways for seals associated with other carriers, such as carrier 12. Non-sealing apertures 36 will also be located and sized such that they permit seals from other carriers which are associated with sealing-apertures 36 to pass through them. Typically, non-sealing apertures 36 will be sized somewhat larger than an associated seal from another carrier or carriers, such as seal 24, so as to permit seal 24 to freely pass through non-sealing apertures 36 in order to enable assembly of gasket assembly 10, and will also be sized such that adequate space exists between such seals 24 and any of apertures 36 so as to allow such seals to be compressed and to laterally expand if necessary during utilization of gasket assembly 10 sufficiently to obtain the desired level of sealing, including applying the desired sealing pressure on the upper sealing surface 28 and lower sealing surface 29 of such seals (see FIG. 6). Seal or seals 40 will preferably be attached to a sidewall 44 of sealing aperture 38. Alternately, it may also be possible to attach seal 40 to one or both of outer surface 32 or mating surface 34, or any combinations of sidewall 44, outer surface 32 or mating surface 34. Attachment of seal 40 may be made by molding the seal to the carrier using well-known molding methods which will vary according to the material selected for carrier 14 and seal 40, or by adhering the seal 40 to the carrier 14 using adhesives or thermal bonding, or by other well-known methods and means of attachment, including the use of mechanical fasteners, slip or compression fit of seals 40 having features which interlock with the carrier and the like. While second carrier is described herein as having at least one non-sealing aperture 36 and at least one sealing aperture 38, it will be understood that first carrier 12 may have any number of sealing apertures 38 and non-sealing apertures 36 necessary to implement a desired gasket design.

Referring again to FIGS. 1–4, the mating surfaces 18, 34 of first carrier 12 and second carrier 14, respectively are in touching contact with one another with the at least one non-sealing aperture 20 of first carrier 12 aligned to and associated with at least one sealing aperture 38 of second carrier 14, and likewise with at least one non-sealing aperture 36 of second carrier 14 aligned to and associated with at least one sealing aperture 22 of first carrier 12. The seals 24, 40 are each adapted to extend through the respective associated non-sealing aperture 36, 20 and provide a first sealing surface 48, comprising upper sealing surfaces 28, 46, at outer surface 16 of first carrier 12 and a second sealing surface 50, comprising lower sealing surfaces 29, 47 at the outer surface of said second carrier. Surfaces 28, 46 comprising first sealing surface 48 may be generally co-planar or generally non-coplanar depending on the design and geometry of the mating elements 49 of the sealed joint 51 to which gasket assembly 10 is a part. Likewise surfaces 29, 47 comprising second sealing surface 50 may be generally co-planar or generally non-coplanar depending on the design and geometry of the mating elements of the sealed joint to which gasket assembly 10 is a part.

Seals 24, 40 utilized herein may be of any material suitable for forming a seal with the mating elements of the sealed joint, including impregnated papers, corks, fabrics including felt, metals, composites and various elastomers. With regard to application of the invention in many of the types of sealed joints utilized in automotive vehicles, seals 24, 40 will preferably comprise various elastomeric materials. The type of elastomeric material used for each of seal 24 and seal 40 will depend upon the nature of the sealed joint and the application requirements placed upon the gasket assembly 10 and seals 24, 40. Generally, elastomeric seals may be grouped by their resistance to the fluid being sealed within the passageway of the sealed joint in which the seal is to be utilized. In order for seals 24, 40 to maintain sealing integrity over time, seals 24, 40 must be resistant to the fluid flowing through the passageways with which seals 24, 40 are associated. In the case of application of the invention to automotive vehicles, the general categories of resistance include engine coolant resistance, engine oil resistance, automatic transmission fluid resistance, power steering fluid resistance, HVAC refrigerant resistance and air/fuel resistance. These fluids represent various differing chemical compounds and mixtures which are well-known, and thus not described further herein. Given the complexities of modern sealing applications in automotive vehicles, where these fluids are frequently flowing through passageways in the engine, cylinder head, intake manifold and other components in close proximity to one another, it is frequently desirable at sealed joints between them, to seal in a single gasket assembly passageways and openings associated with two or more fluids requiring different chemical resistances and hence, preferably different seal materials. Hence, seal 24 and seal 40, and additional seals in the case where more than two carriers are utilized, or where more than one type of seal material is incorporated into a single carrier, may be selected according to the design requirements from a group consisting of engine coolant-resistant elastomers, fuel-resistant elastomers, engine oil resistant elastomers, automatic transmission resistant elastomers, power steering fluid resistant elastomers and refrigerant resistant elastomers. In accordance with the invention, members of the various groups will include elastomeric materials having well-known resistances to these fluids. For example, fuel/air resistant elastomers will include various fluorocarbon and other elastomers or rubbers, including, for example, vinylidene-hexafluoropropylene elastomer (FKM), tetrafluoroethylene/propylene elastomer (FEPM), epichchlorohydrin elastomer (ECO), hydrogenated acrylonitrile-butadiene copolymer elastomer (HNBR) and fluorosilicones having methyl and vinyl groups (VMQ) (fuel vapor only). Oil resistant elastomers will include various fluorocarbon elastomers or other elastomers, including, for example, polychloroprene (CR), acrylonitrile-butadiene copolymer elastomer (NBR), HNBR, alkyl acrylate copolymer elastomer (ACM), ethylene acrylic (AEM), FKM and FEPM. Coolant, including long life coolant, resistant elastomers will include various fluorocarbon and other elastomers or rubbers, including, for example, ethylene propylene copolymer, or terpolymer, with a diene (EPDM), VMQ, NBR, HNBR, FKM (peroxide cured only) and FEPM. Automatic transmission fluid resistant elastomers will include various fluorocarbon elastomers or other elastomers, including, for example, FKM, FEPM, HNBR, ACM, AEM and ethylene vinyl acetate (EVA). Refrigerant resistant elastomers will include various elastomers, including, for example, HNBR and EPDM. Power steering fluid resistant elastomers will include various elastomers, including, for example, HNBR and NBR.

Gasket assembly 10 may preferably also include a means for joining first carrier 12 and second carrier 14. This may include temporary or permanent means for joining the carriers, permanent means may include various adhesives placed onto one or both of the mating surfaces, or onto an additional member which is placed between or which extends around the periphery of the carriers, rivets or other fasteners which extend through the carriers, welds, thermal bonds or brazing between the carriers or around their periphery, or any other well-known means for joining carriers to one another.

Referring again to FIGS. 1–6, while the invention has been illustrated and described herein with respect to the first carrier 12 and second carrier 14, it will also be understood that the present invention may incorporate any desired number of carriers and may incorporate a corresponding number of different types of seals. Further, even where two carriers are utilized, it will be understood that each carrier may incorporate more than one type of seal. As such, the present invention may also be described as a gasket assembly 10, comprising a plurality of carriers 12, 14 (e.g., 2-n carriers, where n is the number of carriers) with each carrier having a at least one non-sealing apertures (i.e., non-sealing apertures 20, 36) and at least one sealing aperture (i.e., sealing apertures 22, 38) with a seal (i.e., seals 24, 40) which extends around a perimeter (i.e., perimeter 26, 42 of the sealing aperture and is attached to the carrier. The plurality of carriers comprise a stack 52 of carriers, each of the carriers of stack 52 being in touching contact with at least one other of the carriers with the non-sealing apertures of the carriers aligned to and associated with the sealing apertures such that each seal extends through aligned and associated non-sealing apertures in the other carriers and provides a first sealing surface 48 at a first outer surface 54 of the stack 52 and a second sealing surface 50 at a second outer surface 56 of the stack 52. With respect to the incorporation of multiple seal types on a given carrier, referring to FIG. 5, seal 24 which represents a first elastomeric material and seal 24' which represents a second elastomeric material, with upper sealing surface 28' and lower sealing surface 29', that is different than the first elastomeric material are shown as being illustrative of the fact that a plurality of different seal types may be incorporated onto a single carrier. Further, this concept may be extended to one or more or all of the carriers of stack 52. Thus, a plurality of different seal types may be incorporated into each stack of carriers.

It is believed that the advantages provided by the present invention may facilitate passing new combinations of fluids, such as some combinations of those fluids described herein, through a single sealed joint, thereby enabling new types of sealed joints in automotive vehicle and other applications. This may promote passing fluids for treatment, such as cooling, to portions of the vehicle other than are known and practiced currently.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A gasket assembly, comprising a plurality of carriers, each of said carriers having at least one non-sealing aperture and at least one sealing aperture with a seal which extends around a perimeter of the sealing aperture and is attached to the carrier; the plurality of carriers comprising a stack of carriers, each of said carriers in touching contact with at least one other of said carriers with the non-sealing apertures of the carriers aligned to and associated with the sealing apertures such that each seal extends through aligned and associated ones of said non-sealing apertures in the other carriers and provides a first sealing surface at a first outer surface of the stack and a second sealing surface at a second outer surface of the stack.

2. The gasket assembly of claim 1, further comprising a means for joining the plurality of carriers together to form the stack.

3. A gasket assembly, comprising:
a first carrier having an outer surface, a carrier mating surface, at least one non-sealing aperture, at least one sealing aperture, and at least one first seal which is attached to said first carrier and which extends around a perimeter of the sealing aperture;
a second carrier having an outer surface, a carrier mating surface, at least one non-sealing aperture, at least one sealing aperture, and at least one second seal which is attached to said second carrier and which extends around a perimeter of the sealing aperture; the mating surfaces of said first carrier and said second carrier in touching contact with one another with the at least one non-sealing aperture of said first carrier aligned to and associated with the at least one sealing aperture of said second carrier, and with the at least one non-sealing aperture of said second carrier aligned to and associated with the at least one sealing aperture of said first carrier, the seals each adapted to extend through the respective associated non-sealing aperture and provide a first sealing surface at the outer surface of said first carrier and a second sealing surface at the outer surface of said second carrier.

4. The gasket assembly of claim 3, wherein the at least one first seal and the at least one second seal are each formed from an elastomeric material.

5. The gasket assembly of claim 3, wherein the at least one first seal is attached to said first carrier at a sidewall of its at least one sealing aperture and the at least one second seal is attached to said second carrier at a sidewall of its at least one sealing aperture.

6. The gasket assembly of claim 4, wherein the at least one first seal and the at least one second seal comprise different elastomeric materials.

7. The gasket assembly of claim 4, wherein the at least one first seal and the at least one second seal comprise the same elastomeric material.

8. The gasket assembly of claim 6, wherein the gasket assembly is an automotive vehicle gasket assembly.

9. The gasket assembly of claim 8, wherein the elastomeric material of the first seal and the elastomeric material of the second seal are selected from a group consisting of engine coolant-resistant elastomers, fuel-resistant elastomers, engine oil resistant elastomers, automatic transmission fluid resistant elastomers, refrigerant resistant elastomers and power steering fluid resistant elastomers.

10. The gasket assembly of claim 8, wherein the elastomeric materials of the at least one first seal and the at least one second seal are selected from a group consisting of FKM, FEPM, ECO, HNBR, VMQ, CR, NBR, ACM, AEM, EVA and EPDM.

11. The gasket assembly of claim 3, further comprising a means for joining said first carrier to second carrier.

12. The gasket assembly of claim 3, wherein each of said seals is formed from an elastomeric material.

13. The gasket assembly of claim 3, wherein each of said seals is attached to a sidewall of its sealing aperture.

14. The gasket assembly of claim 12, wherein the seal of each of said carriers comprises an elastomeric material which is different from that of the other carriers.

15. The gasket assembly of claim 12, wherein the seal of each of said carriers comprises the same elastomeric material.

16. The gasket assembly of claim 14, wherein the gasket assembly is an automotive vehicle gasket assembly.

17. The gasket assembly of claim 16, wherein the elastomeric material of the first seal and the elastomeric material of the second seal are selected from a group consisting of engine coolant-resistant elastomers, fuel-resistant elastomers, engine oil resistant elastomers, automatic transmission fluid resistant elastomers, refrigerant resistant elastomers and power steering fluid resistant elastomers.

18. The gasket assembly of claim 17, wherein the elastomeric materials of the at least one first seal and the at least one second seal are selected from a group consisting of FKM, FEPM, ECO, HNBR, VMQ, CR, NBR, ACM, AEM, EVA and EPDM.

* * * * *

UNITED STATES PATENT AND TRADEMARK OFFICE
CERTIFICATE OF CORRECTION

PATENT NO. : 7,070,187 B2 Page 1 of 1
APPLICATION NO. : 10/984215
DATED : July 4, 2006
INVENTOR(S) : Gregory A. Boeve It is certified that error appears in the above-identified patent and that said Letters Patent is hereby corrected as shown below:

Column 2, line 54: "sealed a joint" should be --sealed joint--.

Column 4, line 20: "first carrier" should be --first carrier 12--.

Column 4, line 63: "second carrier" should be --second carrier 14--.

Column 5, line 14: "second carrier" should be --second carrier 14--.

Column 5, line 21: "mating elements of the sealed joint" should be --mating elements 49 of the sealed joint 51--.

Column 6, line 48: "(i.e., perimeter 26, 42" should be --(i.e., perimeter 26, 42)--.

Signed and Sealed this

Twentieth Day of March, 2007

JON W. DUDAS
*Director of the United States Patent and Trademark Office*